UNITED STATES PATENT OFFICE.

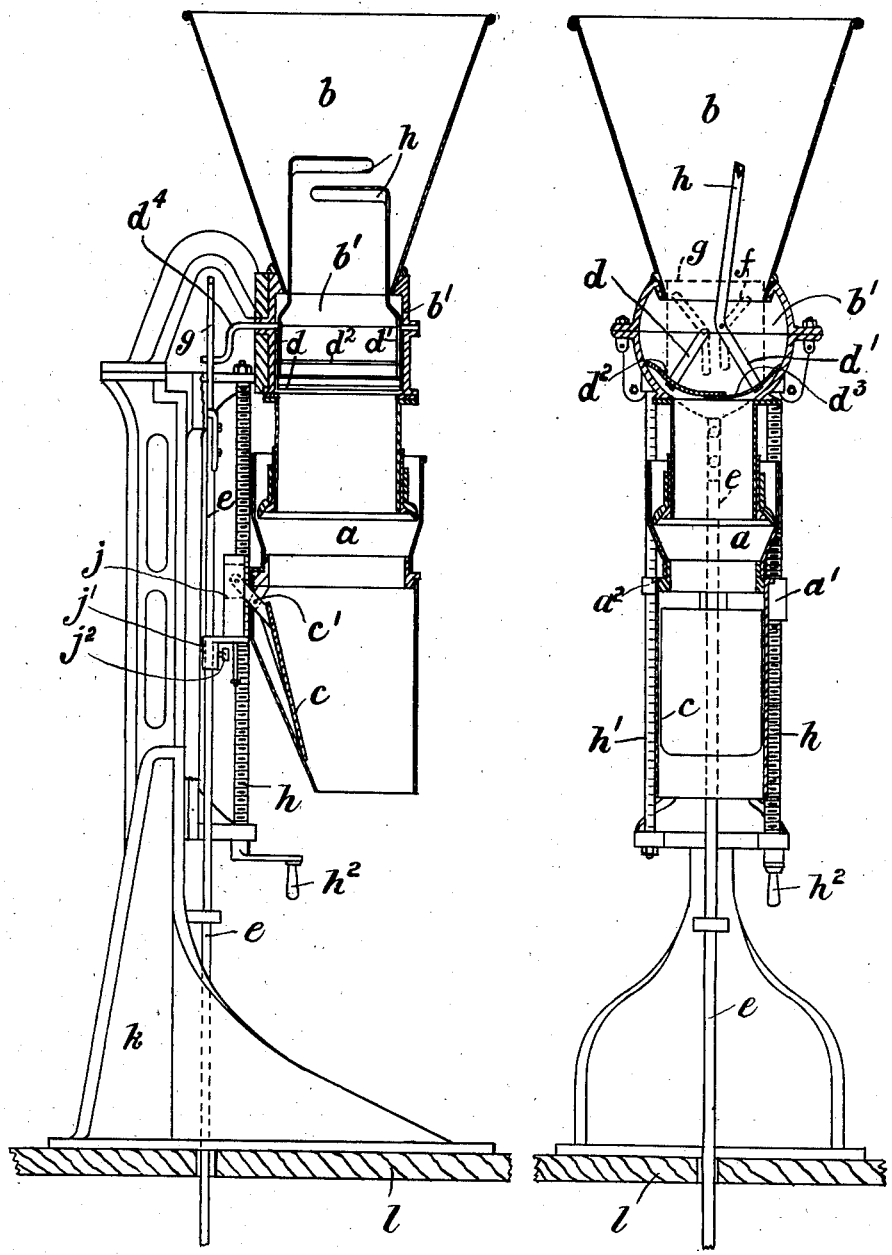

ANDREW JAMES JOHNSTON AND CHARLES KINGSLEY JOHNSTON, OF LIVERPOOL, ENGLAND.

DRY MEASURER.

No. 830,666.

Specification of Letters Patent.

Patented Sept. 11, 1906.

Application filed October 20, 1905. Serial No. 283,652.

*To all whom it may concern:*

Be it known that we, ANDREW JAMES JOHNSTON and CHARLES KINGSLEY JOHNSTON, manufacturers, subjects of the King of Great Britain, residing at Liverpool, in the county of Lancaster, in the Kingdom of England, have invented certain new and useful Improvements in Dry Measurers, (for which application has been made in Great Britain, No. 26,368, dated December 3, 1904,) of which the following is a specification:

This invention has for its object an apparatus wherein given quantities of flour, cocoa, and other substances can be measured automatically and filled into bags or other receptacles required with much greater economy in time and labor than by the usual hand method. A previous machine has been invented by us for this purpose; but it has been found that while it was extremely good for measuring granular substances it was not suitable for pulverulent substances, nor for substances in larger pieces, such as lump-sugar. The present arrangement has been designed to overcome this difficulty and has been found very efficient for measuring flour, cocoa, and the like, while it still serves equally well for other substances, such as tea, dried fruit, lump-sugar, and the like.

In order that the invention may be fully understood, reference will now be had to the accompanying drawings, in which—

Figure 1 is a sectional side view, and Fig. 2 a sectional front view, of an apparatus embodying the present improvements.

In carrying the invention into effect we provide a hollow measure or container $a$, in the drawings shown as adjustable, adapted to hold any given quantity of material, and a hopper $b$ with a spout or valve chamber $b'$ at bottom for feeding said container with the material required to be measured. This measure has an outlet-valve at the bottom and a cut-off valve at the top, which are worked automatically by a reciprocating vertical rod $e$. The cut-off valve consists of a pair of shutters which are made to meet or separate by means of bent arms $d^4$, working in a Y-shaped slot $f$ in a plate $g$ at the top of the actuating-rod $e$ or by other suitable device, each shutter comprising a pair of arms $d$ $d'$, pivoted outside the spout, one at each side, each with a curved plate $d^2$ $d^3$ joining them together at bottom and made in the arc of a circle whose center is the pivot on which the side arms turn. The mouth of the spout is also made of a similar curve. Consequently when the two shutters are made to meet, their curved plates or arcs $d^2$ $d^3$ cut through the column of material being measured and close the measure $a$ from the hopper $b$, and thus cut off the supply into the measure $a$. It will thus be noted that this cut-off or inlet valve is entirely inclosed and that no pulverulent matter can escape to the outside. The outlet-valve $c$ is then opened to discharge the measured material from the measure into a bag or other receptacle. The outlet-valve $c$ is preferably formed of a pivotal plate, as shown. The valves act alternately. When the measure has emptied itself, the outlet-valve $c$ closes and the shutters of the cut-off valve separate to admit a fresh charge of material from the spout $b'$ into the measure $a$. The hopper can be provided with a suitable agitating device, so as to prevent the pulverulent material sticking to the sides of the hopper. This may consist of agitators or rods $h$, worked from the arms $d$ $d'$.

$a'$ and $a^2$ are sleeves, while $h$ and $h'$ are guides for the lower part of the measure $a$, the former being threaded and the latter graduated or marked with scales or amounts. The guide $h$ is provided with a handle $h^2$, so as to permit of the easy adjustment of the measure by the raising or lowering of the lower part of the measure $a$. The outlet-valve $c$, which is pivoted at $c'$, is connected to a bracket $j$, having a sleeve $j'$ adjustable on the actuating-rod $e$ by means of a set-screw $j^2$.

$k$ is the frame supporting the machine, while $l$ represents a counter or the like on which the frame is supposed to be resting.

We declare that what we claim is—

1. In a machine for measuring pulverulent, granular and like substances, a measuring-chamber, a hopper leading to said chamber, a valve-chamber intermediate to said measure and said hopper the said valve-chamber having a mouth forming a curve and entirely inclosing the space between said hopper and said measuring-chamber, curved plates adapted to be approached and moved away one from the other and adapted to close the mouth of said valve-chamber and an outlet-valve to said measuring-chamber.

2. In a machine for measuring pulverulent, granular and like substances, a measuring-chamber, curved plates, pivots located at the centers of curvature of said plates, arms connecting said pivots and said plates, a chamber surrounding said plates, curved arms connected to said pivots extending outside said said chamber, an actuating-rod having a Y-shaped slot adapted to engage said exterior arms, an outlet-valve, means connecting said outlet-valve to said actuating-rod.

3. In a machine for measuring pulverulent, granular and like substances, a measuring-chamber, a hopper, a circular valve-chamber intermediate to said hopper and said measuring-chamber, curved plates inclosed by and adapted to be oscillated in said valve-chamber, and to cut off said valve-chamber from said measure.

4. In a machine for measuring pulverulent, granular and like substances, a measuring-chamber, a hopper, a circular valve-chamber intermediate to said hopper and said measuring-chamber, curved plates adapted to be oscillated in said valve-chamber, and to cut off said valve-chamber from said measure, means for actuating said plates agitating devices located in said hopper and connected to said curved plates.

5. In a machine for measuring pulverulent, granular and like substances, a measuring-chamber, a stationary and a lower adjustable part comprising said measuring-chamber, guides for said movable part, screw means for raising and lowering said part, an outlet-valve, means for adjusting said outlet-valve according to the position of said lower part, an inlet-valve to said upper stationary part, means inclosing the said inlet-valve, and means for feeding the material to be measured to said measuring-chamber.

6. In a machine for measuring pulverulent, granular and like substances, an adjustable measuring-chamber, an outlet-valve, an inlet-valve comprising curved plates each adapted to be swung about its center of curvature, arms supporting said plates, arms connected to said supporting-arms and extending to the exterior of the machine, a plate provided with slots adapted to operate said exterior arms, an actuating-rod secured to said plate and to said outlet-valve.

7. In a machine for measuring pulverulent, granular and like substances, an adjustable measuring-chamber, an outlet-valve, an inlet-valve comprising curved plates each adapted to be swung about its center of curvature, arms supporting said plates, arms connected to said supporting-arms and extending to the exterior of the machine a plate provided with slots adapted to operate said exterior arms, an actuating-rod secured to said plate and to said outlet-valve, a hopper, an agitating device working in said hopper and integral with the arms secured to said curved plates.

In witness whereof we have hereunto signed our names, this 11th day of October, 1905, in the presence of two subscribing witnesses.

ANDREW JAMES JOHNSTON.
CHARLES KINGSLEY JOHNSTON.

Witnesses:
 G. C. DYMOND,
 W. H. BEESTON.